Patented Apr. 27, 1937

2,078,534

UNITED STATES PATENT OFFICE 2,078,534

CYCLIC ACETALS AND PROCESS FOR PRODUCING SAME

Herbert P. A. Groll and George Hearne, Berkeley, Calif., assignors to Shell Development Company, San Francisco, Calif., a corporation of Delaware No Drawing. Application May 25, 1935,
Serial No. 23,521

8 Claims. (Cl. 260—54)

This invention relates to a process for the conversion of unsaturated alcohols to valuable organic oxy-compounds, particularly saturated polyhydric alcohols containing at least one more hydroxyl group than the alcohol treated and the cyclic acetals of such polyhydric alcohols, some of which are novel compounds.

The invention provides a practical and economical process for the production of saturated polyhydric alcohols from unsaturated alcohols, especially those unsaturated alcohols possessing an unsaturated tertiary carbon atom not more than once removed from a carbinol group, which process comprises the steps of treating the unsaturated alcohol, either alone or in the presence of an aldehyde, with an acid-acting compound in the absence or presence of water at a temperature and for a time sufficient to effect substantial conversion of the treated alcohol to a cyclic acetal, separating the cyclic acetal from the reaction mixture, and hydrolyzing the cyclic acetal to the corresponding polyhydric alcohol and an aldehyde or ketone.

It is known that unsaturated alcohols which possess an unsaturated tertiary carbon atom linked to or once removed from a carbinol group are readily rearranged to the corresponding isomeric aldehydes on treatment with water and an acid-acting compound under conditions at which direct hydration would occur at a practical rate. Accordingly, attempts to effect the direct hydration of unsaturated alcohols of this type have resulted in very poor yields of the corresponding saturated polyhydric alcohols containing a tertiary carbinol group.

Now, we have found that the readily rearrangeable unsaturated alcohols which cannot be hydrated in a practical and economical manner may be converted easily and in excellent yields to cyclic acetals. A cyclic acetal corresponding to such a compound which would be formed by reaction of the hydrated unsaturated alcohol with an aldehyde is formed by treating the unsaturated alcohol with an acid-acting compound. The cyclic acetal is formed by reaction of the unsaturated alcohol with an aldehyde, which aldehyde may be formed in situ by molecular rearrangement of the unsaturated alcohol or may be added to the alcohol prior to or during its treatment. We may effect the reaction in the initial presence of the same aldehyde which would be formed by rearrangement of the treated alcohol or in the initial presence of a different aldehyde or mixture of aldehydes.

The cyclic acetals prepared by our method can, on treatment with water or an aqueous solution of an acid-acting compound under conditions at which the saturated polyhydric alcohol is substantially stable, be substantially completely hydrolyzed to the corresponding saturated polyhydric alcohol and aldehyde. Virtually complete hydrolysis may be effected by removing either the polyhydric alcohol, the aldehyde or both of the hydrolysis products from the reaction mixture substantially as soon as they are formed therein. Due to the relatively lower boiling temperature of the aldehydes, they are conveniently removed from the hydrolysis mixture by distillation at the same time that reaction is effected. The hydrolysis may be effected at any desired pressure. When hydrolysis is effected with water alone the rate of hydrolysis may be accelerated by employing superatmospheric pressures.

If desired, the cyclic acetal may be hydrolyzed in the presence of water and an acid-acting compound under such conditions that the saturated polyhydric alcohol formed on hydrolysis is converted to the corresponding aldehyde or ketone and substantially only carbonylic compounds of the class consisting of aldehydes and ketones are obtained.

As the description of our invention proceeds it will be seen that the same provides a practical and economical process for the conversion of unsaturated alcohols to valuable cyclic acetals and polyhydric alcohols. Cyclic acetals have hitherto been prepared by the more difficult and costly methods of reacting polyhydric alcohols with aldehydes. In accordance with our method, unsaturated alcohols may, by effecting the intermediate formation and subsequent hydrolysis of cyclic acetals, be converted to valuable polyhydric alcohols and aldehydes, which polyhydric alcohols are suitable for a wide variety of purposes for which the unsaturated alcohol is unsuitable. If the cyclic acetal is formed in the initial presence of an added aldehyde, said aldehyde which is consumed in the formation of the acetal may, in the hydrolysis step of the process, be substantially completely recovered and reutilized. Thus the only raw material consumed in any substantial quantity, in this preferred mode of operation, is the applied olefine alcohol.

The unsaturated alcohols which we employ possess at least one olefinic linkage between two aliphatic carbon atoms and at least one carbinol group. Preferably, the unsaturated alcohols will possess an iso-alkyl chain containing an unsaturated tertiary carbon atom, which chain may or may not be linked to a cyclic radical as of the aromatic, alicyclic and heterocyclic series, or the unsaturated alcohol may comprise part of an alicylic structure. The unsaturated alcohols may be employed severally or mixtures comprising more than one species of alcohol may be used.

A particularly suitable group of olefine alcohols includes those of mono-olefinic character which possess at least one of the groupings

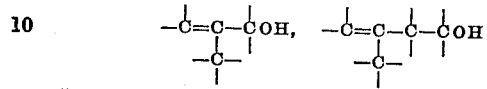

or

regardless of the character of the organic compound in which such a grouping may be contained. The loose bonds of the above groupings may be taken up by hydrogen atoms and/or by alkyl, alkoxy, aralkyl, aralkoxy, aryloxy, carbocyclic, heterocyclic and/or other suitable organic radicals which may or may not be further substituted, or the loose bonds may be taken up by suitable inorganic substitutents. The loose bonds may also be taken up by carbinol groups and/or hydroxyl radicals, however, it is understood that a hydroxyl radical may not be linked to an unsaturated carbon atom or to a carbinol group.

The following list is intended to include examples of preferred unsaturated alcohols which may be converted to cyclic acetals and/or saturated polyhydric alcohols in accordance with our invention.

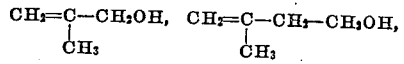
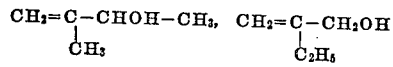
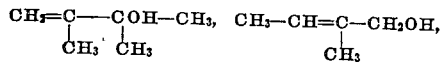
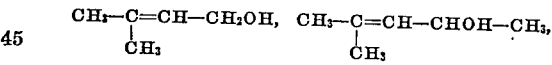
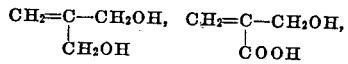
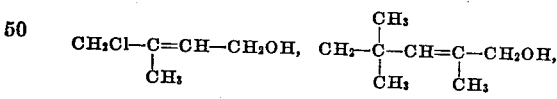
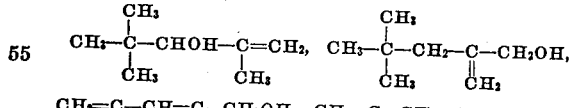
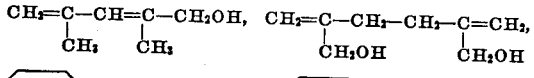
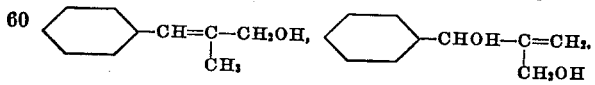
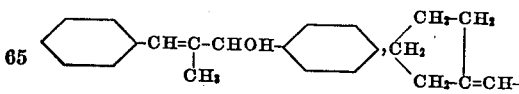

and the like as well as their homolgues, analogues and suitable substitution products.

The step which comprises formation of the cyclic acetal may be executed by treating a suitable unsaturated alcohol with an acid-acting compound under such conditions that at least a part of the unsaturated alcohol is molecularly rearranged to the corresponding aldehyde which presumably reacts with the unsaturated alcohol present to form the cyclic acetal. Alternatively, we may prepare the acetal by reacting the unsaturated alcohol with an aldehyde which has been added thereto in an amount at least equal to that theoretically required to react with all of the unsaturated alcohol present. The aldehyde initially present may be the same or different from that which would be formed on rearrangement of the unsaturated alcohol. When the added aldehyde is different from that which may be formed by rearrangement, a mixture of several species of acetals may result.

The cyclic acetals may be prepared by reacting a suitable unsaturated alcohol with a wide variety of aldehydes. A suitable list includes formaldehyde, propionaldehyde, butyraldehyde, isobutyraldehyde, the valeraldehydes and the like as well as their homologues, analogues and suitable substitution products. The aromatic aldehydes as benzaldehyde and its homologues and analogues are also suitable. Unsaturated aldehydes may be used and unsaturated cyclic acetals obtained; however, less severe reaction conditions should be used if excessive polymerization and condensation reactions are to be avoided. The aldehydes may be used severally or mixtures comprising more than one species may be used and a mixture of acetals obtained.

The initial reaction to form the cyclic acetal is effected in the presence of an acid or acid-acting compound. The hydrolysis step may be effected in the presence of an acid-acting compound or, in some cases, in the presence of water alone. Suitable acids and acid-acting compounds include the mineral acids, mineral acid-acting salts and other substances capable of acting as mineral acids under the conditions of operation and in contact with the reactants and water in the reaction mixture. For example, we may employ the strong mineral acids such as $H_2SO_4$, $H_2S_2O_7$, $HPO_3$, $HCl$, $HBr$, $H_4P_2O_7$, $H_3PO_4$, $HNO_3$, $HClO_4$, and the like. Other suitable substances are compounds which form mineral acids with water such as $SO_2Cl_2$, $SOCl_2$, $SOBr_2$, $SO_2$, $N_2O_3$, $NOCl$, $POCl_3$, $PCl_3$, $PCl_5$ and the like and the mineral acid-acting salts such as $ZnSO_4$, $ZnCl_2$, $FeCl_3$, $AlCl_3$, $Fe_2(SO_4)_3$, $NaHSO_4$, $Al_2(SO_4)_3$, $NaH_2PO_4$ and the like. In addition, we may employ organic salts and compounds capable of acting as mineral acids under the conditions of operation such as ethyl sulphonic acid, benzene sulphonic acid and its homologues and analogues, dialkyl and alkyl acid sulphates, alkylated phosphoric and sulphonic acids, halogenated organic acids, acids such as sulpho-acetic, acid halides and compounds such as aniline hydrochloride and the like. In some cases, the process may be executed employing the stronger organic acids, for example, oxalic acid.

For the purpose of illustrating the invention and rendering the principles of the same clear and understandable, the reaction assumed to occur is represented by the specific equation for the reaction of isobutenol with isobutyraldehyde in the presence of an acid-acting compound to form the corresponding cyclic acetal.

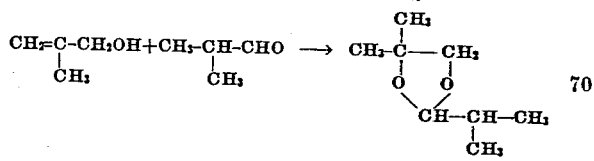

The isobutyraldehyde may be added to the isobutenol in the required amount or in molal excess thereof and reaction effected at a temperature at which the acetal is formed at a practical rate while undesirable side reactions as hydrolysis of the acetal, rearrangement of the unsaturated alcohol and polymerization and/or condensation of the aldehyde is avoided. However, if isobutyraldehyde is desired as a product of the reaction, we may not add this compound to the isobutenol but utilize the isobutyraldehyde formed in situ by the rearrangement of part of the isobutenol. In this manner, the isobutenol may be substantially completely converted to the cyclic acetal which on hydrolysis yields isobutylene glycol and isobutyraldehyde. Under some conditions of cyclic acetal formation, a substantial amount of the cyclic acetal may be hydrolyzed and the reaction mixture, in addition to the acetal, may contain considerable quantities of the corresponding polyhydric alcohol.

The hydrolysis step of the process may be represented by the specific equilibrium equation:

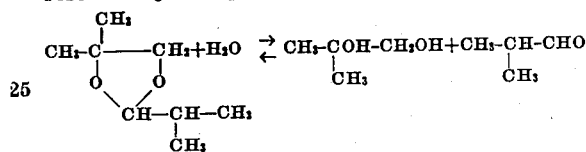

An equilibrium exists between the components of the above system when they are present in dilute aqueous solution of an acid or acid-acting substance. The cyclic acetal can be substantially completely hydrolyzed to the corresponding polyhydric alcohol and aldehyde under conditions at which the polyhydric alcohol is substantially stable. The polyhydric alcohol and/or the aldehyde may be removed from the acidic reaction mixture as formed therein, thus shifting the equilibrium reaction to the right. In some cases, particularly when the polyhydric alcohol obtained possesses only secondary, tertiary or secondary and tertiary carbinol groups, in addition to an aldehyde, a certain amount of a ketone is obtained. This ketone is obtained by conversion of the polyhydric alcohol in accordance with a mechanism which is at present not fully understood.

In the execution of the primary step of our process, the yield of acetal obtained will be dependent upon the acid concentration of the reaction mixture, the temperature and pressure of operation, the contact time of the reactants and upon the concentration of the aldehyde in the aqueous acidic solution. The reaction may be effected in a variety of suitable manners. The unsaturated alcohol in the initial presence or absence of an aldehyde may be contacted with a dilute aqueous acid solution (0.03% to about 4% calculated as %$H_2SO_4$) and the mixture heated under a superatmospheric pressure until the formed cyclic acetal can be distilled from the system with the still-head temperature above the boiling temperature of the aldehyde and water under the pressure in the still. Superatmospheric pressures need not be used. Substantially the same results are attainable by employing higher acid concentrations, elevated but relatively lower temperatures and effecting removal of the acetal by distillation or other means at atmospheric or reduced pressures. For example, we may employ aqueous acid solutions having concentrations of from about 4% to about 25% calculated as %$H_2SO_4$ and remove the acetal at the boiling temperature of the reaction mixture at atmospheric pressure. Alternatively, we may employ relatively concentrated aqueous acid solutions or even a small amount of anhydrous acid and effect reaction at lower temperatures and atmospheric pressure. The cyclic acetal may be recovered from the reaction mixture in any manner, for example, by stratification, distillation, extraction, reaction and the like means. If desired, reaction may be effected in the presence of relatively inert substances as hydrocarbons, chlorinated hydrocarbons, organic acids, inert gasses as $N_2$, $CO_2$ and the like which substances when in the liquid stage may serve as solvents or which may be added to facilitate removal of the acetal.

When distillation methods of recovering the cyclic acetal from the reaction mixture are resorted to, the condensed distillate, which, in addition to the acetal, may contain water, aldehyde, unsaturated alcohol and other volatile substances employed as solvents or to facilitate separation of acetal, may be treated in a variety of suitable manners and separation of the constituents effected, for example, by stratification, extraction, distillation, centrifugation and the like. If desired, such crude mixtures may be treated in accordance with the hydrolysis step of our process without resorting to separation of the cyclic acetal therefrom.

The hydrolysis of the cyclic acetal is preferably effected by treating it with water or a relatively dilute aqueous solution or suspension of an acid or acid-acting substance at a temperature at which the formed polyhydric alcohol is substantially stable and the aldehyde can be distilled from the reaction mixture at a rate prohibitive to its substantial accumulation therein. Excellent results are attained by employing aqueous acid solutions having concentrations of about 0.05% calculated as %$H_2SO_4$. Higher or lower acid concentrations may be used when necessary or desirable. The use of higher concentrations is in general less desirable since excessive dehydration of the polyhydric alcohol and condensation of the aldehyde may occur. Further, the polyhydric alcohols are more easily and economically recovered in a substantially pure state from neutral or slightly basic aqueous solutions. Consequently, the use of the weaker acid solutions minimizes losses of acid occasioned by neutralization of the reaction mixture prior to recovery of the acid therefrom.

Our process is particularly applicable to the production of cyclic acetals from unsaturated alcohols containing an unsaturated tertiary carbon atom, which cyclic acetals will contain a tertiary carbon atom embraced in the heterocyclic ring and will, on hydrolysis, yield a polyhydric alcohol containing a tertiary carbinol group. The cyclic acetals of this type have hitherto not been hydrolyzed to the corresponding polyhydric alcohol and aldehyde. It is known that the polyhydric alcohols containing a tertiary carbinol group would under conditions known to be effective in hydrolyzing cyclic acetals of other types be substantially completely converted to carbonylic compounds due to their greater instability. We have discovered that the cyclic acetals containing a tertiary carbon atom in a heterocyclic ring may be hydrolyzed to the corresponding polyhydric alcohols containing a tertiary carbinol group under conditions at which the polyhydric alcohol is substantially stable. When hydrolysis is effected while the aldehyde or ketone, usually with water, is distilled from the system, the condensed distillate which consists, for the most part, of aldehyde and water may be used per se in the first step of the process which comprises acetal formation, or the distillate may be treated in any suitable manner and the aldehyde, if an aldehyde is obtained, recovered in the desired degree of purity for reuse in the process or for any other suitable purpose.

When the hydrolysis reaction has been effected to the desired extent, the reaction mixture may be neutralized or made slightly basic by the addition thereto of an equivalent amount or slight excess of a basic-acting agent, and the polyhydric alcohol recovered from the neutral or slightly basic mixture by any suitable means. Suitable neutralizing agents include the basic metal oxides, hydroxides, carbonates, bicarbonates and the like as well as ammonia, suitable basic ammonium compounds and some organic bases. The polyhydric alcohol may be recovered by heating the neutralized or slightly basic reaction mixture under atmospheric or subatmospheric pressure and distilling or evaporating water therefrom until the solution is concentrated to the desired degree. The residue which will contain the polyhydric alcohol and a salt, may be filtered for removal of the salt and the filtrate used per se or, if a purer alcohol is desired, the filtrate may be treated with a suitable selective solvent and the alcohol recovered from the extract solution in a substantially pure condition by distillation. The recovered polyhydric alcohol may be purified by distillation preferably under subatmospheric pressure. In some cases, it may be desirable to recover the polyhydric alcohol by treating the neutral, slightly acidic or slightly basic aqueous reaction mixture with a suitable selective extractant agent. The hydrocarbons, halogenated hydrocarbons, water insoluble alcohols, ethers and the like are suitable extractants.

It will be evident to those skilled in the art to which our invention appertains that the same may be executed in a batch, intermittent or continuous manner. In a continuous mode of operation, the unsaturated alcohol and a suitable carbonylic compound may be continuously introduced into an aqueous acidic solution contained in a suitable reaction vessel which is preferably equipped with heating means and means for effecting agitation of its contents. The reaction mixture may be kept at a suitable temperature and pressure and the cyclic acetal distilled or otherwise removed from the reaction vessel at about the same rate at which it is formed. The initial reaction stage may be in communication with a hydrolyzer wherein the cyclic acetal may be intermittently or continuously hydrolyzed to the polyhydric alcohol and carbonylic compound. The carbonylic compound which is preferably removed from the hydrolyzer substantially as soon as it is formed therein, may or may not be reutilized in the same or another reactor for the preparation of the cyclic acetal depending on whether or not an aldehyde is also desired as a reaction product. The hydrolyzer may be in communication with a recovery stage wherein the polyhydric alcohol may be recovered from the hydrolysis reaction mixture in the desired degree of purity.

The following examples are introduced for the purpose of illustrating preferred modes of executing our invention. It is to be understood that it is not our intention to limit the invention to the methods of operation, specific conditions and specific unsaturated alcohols disclosed.

*Example I*

About 300 cc. of an aqueous 13% $H_2SO_4$ solution were charged to the kettle of a fractionation apparatus and stirred and heated to a temperature of about 95° C., while isobutenol

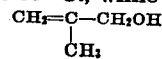

was added below the surface of the solution at such a rate that the still-head temperature was maintained at about 85° C. to about 87° C. This addition and distillation was continued until about 500 gm. of isobutenol had been added and no more of the reaction product could be distilled.

The condensed distillate was washed with water to remove any unreacted isobutenol which might have been carried over, the water separated by stratification and the organic layer dried and fractionated. The fractionation yielded 50 gm. of isobutyraldehyde and 200 gm. of the cyclic acetal of the formula—

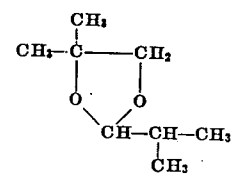

which boiled at about 138° C. under atmospheric pressure. About 250 gm. of isobutenol were recovered by fractionation of the aqueous extractant solution.

Calculated on the basis of isobutenol consumed, the yield of reaction products was:

| | Per cent |
|---|---|
| Acetal of isobutylene glycol and isobutyraldehyde | 80 |
| Isobutyraldehyde | 20 |

This example illustrates extreme conditions of acetal formation in the initial absence of isobutyraldehyde under conditions at which isobutyraldehyde is also obtained as a reaction product.

*Example II*

About 12.20 kgs. (170 mols) of isobutenol were charged to a suitable reaction vessel and about 11 liters of an aqueous 13% $H_2SO_4$ solution were added thereto. This mixture was stirred and refluxed at atmospheric pressure for about 1 hour. At the end of this time the reaction mixture was cooled and allowed to stratify.

The non-aqueous or upper layer was separated, dried and fractionated. The fractionation yielded the following products in the amounts noted:

| Product | Cms. | Mols | Mol. per cent of isobutenol applied |
|---|---|---|---|
| Isobutyraldehyde | 477.0 | 6.6 | 3.9 |
| Acetal of isobutylene gycol and isobutyraldehyde | 11,000.0 | 76.4 | 90.5 |
| Unreacted isobutenol | 106.0 | 1.5 | 0.9 |
| High-boiling polymer | 535.0 | | |

The lower or aqueous layer of the stratified reaction mixture was reutilized to effect conversion of another batch of isobutenol.

*Example III*

About 4 gallons of an aqueous 13% $H_2SO_4$ solution were charged to the kettle of a pressure still and heated to a temperature of from about 115° C. to about 120° C. While the acid solution was vigorously agitated at this temperature, isobutenol was added thereto at such a rate that the still-head temperature was kept at about 75° C. and the distillate was removed at about the same rate at which the isobutenol was added. The operation was terminated when about 2 gallons of isobutenol had been added to the kettle and no more of the conversion product could be distilled therefrom.

The contents of the kettle were cooled, discharged therefrom and neutralized by the addition thereto of an equivalent amount of barium hydroxide. The precipitated barium sulphate was removed from the solution by filtration and the filtrate fractionated. Only about 15 gm. of isobutylene glycol were found in the residue.

The condensed distillate, which was collected while the process was executed, was dried and fractionated. The distillate was isobutyraldehyde which boiled at about 64° C. under atmospheric pressure. A very small amount (about 0.5%) of the acetal of isobutylene glycol with isobutyraldehyde was formed.

This example is included for the purpose of clearly pointing out wherein the step in our process which comprises the production of a cyclic acetal differs from the known process of effecting the molecular conversion of an unsaturated alcohol to its isomeric aldehyde or ketone. Under optimum conditions for conversion of isobutenol to isobutyraldehyde, practically no acetal is formed. Production of the cyclic acetal in accordance with our invention, when the above mode of execution is resorted to, may be effected with the employment of relatively lower kettle temperatures by applying lower pressures necessitating the use of still-head temperatures substantially higher than the boiling temperature of the aldehyde-water azeotrope under the pressure employed.

Example IV

About 250 gm. (2.91 mols) of a mixture of primary isopentenyl alcohols obtained by effecting the hydrolysis of the isopentenyl chlorides obtained by chlorinating tertiary amylene were mixed with about 1500 cc. of an aqueous acid solution containing about 0.05% H₂SO₄. The mixture was refluxed at atmospheric pressure for about 8 hours. At the end of this time the mixture was distilled and all of the materials forming azeotropes with water removed. The residue contained about 85 gm. (0.82 mol.) of a mixture of amylene glycols boiling at about 180° C. to about 188° C.

The distillate containing the compounds which distilled as azeotropes with water was salted out, allowed to stratify and the non-aqueous layer dried and fractionated. The fractionation yielded about 42 gm. (0.41 mol.) of methyl isopropyl ketone, about 110 gm. (1.28 mols) of unreacted isopentenyl alcohols and about 42 gm. (0.20 mol.) of cyclic acetals of amylene glycols with methyl ethyl acetaldehyde.

The yields of the products based on the isopentenyl alcohols consumed were:

| | Per cent |
|---|---|
| Methyl isopropyl ketone | 25 |
| Amylene glycols | 25 |
| Acetals of amylene glycols with methyl ethyl acetaldehyde | 50 |

The mechanism by which the methyl isopropyl ketone is formed is not quite fully understood. It may be formed by rearrangement of the isopentenyl alcohol as well as by hydrolysis of the cyclic acetal.

Example V

About 150 gm. (2.08 mols) of isobutenol were mixed with about 300 cc. of an aqueous sulphuric acid solution containing about 13% H₂SO₄. This mixture was stirred and refluxed at atmospheric pressure for about 1 hour. At the end of this time the mixture was cooled, allowed to stratify and the non-aqueous layer separated, dried and fractionated. The fractionation yielded about 15 gm. (0.21 mol.) of isobutyraldehyde and 123 gm. (0.85 mol.) of the cyclic acetal of isobutylene glycol and isobutyraldehyde.

The cyclic acetal was obtained in a yield of 89% based on the isobutenol consumed.

Example VI

About 100 gm. (1.39 mols) of isobutenol, 150 gm. (2.08 mols) of isobutyraldehyde and about 250 cc. of an aqueous 12% H₂SO₄ solution were mixed and the mixture stirred and refluxed at atmospheric pressure for about 1.5 hours. At the end of this time the mixture was cooled, allowed to stratify and the non-aqueous layer dried and fractionated. The fractionation yielded 123 gm. (0.85 mol.) of the cyclic acetal of isobutylene glycol with isobutyraldehyde and 127 gm. (1.76 mols) of unchanged isobutyraldehyde.

Example VII

About 100 gm. (0.695 mol.) of the acetal of isobutylene glycol with isobutyraldehyde—

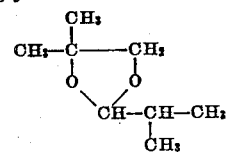

were added to an aqueous sulphuric acid solution containing about 0.05% H₂SO₄. The mixture was stirred and heated to its boiling temperature. An azeotropic mixture of isobutyraldehyde and water was distilled from the system at a temperature of about 60° C. The distillation was continued until no more aldehyde could be detected in the distillate. A total of 49 gm. (0.68 mol.) of isobutyraldehyde were obtained.

The residue was cooled, neutralized and the distillation continued until substantially all of the water had been removed. The residue contained 60 gm. (0.67 mol.) of isobutylene glycol which represents a yield of about 97% calculated on the cyclic acetal treated.

Example VIII

About 3.543 kgs. (24.6 mols) of the acetal of isobutylene glycol with isobutyraldehyde were charged to a distilling apparatus, the kettle of which was equipped with means for mechanically stirring its contents, and about 2 liters of an aqueous 0.05% H₂SO₄ solution were added thereto. The mixture was stirred and heated to its boiling point. An azeotrope of isobutyraldehyde and water was distilled from the system at a still-head temperature of about 60° C. The distillation was continued until no more isobutyraldehyde could be detected in substantial amounts in the distillate.

A total of 1.673 kgs. (23.24 mols) of isobutyraldehyde were recovered.

The residue in the still was neutralized and the distillation continued until substantially all of the water had been removed. The residue contained about 1.995 kgs. (22.17 mols) of isobutylene glycol.

Example IX

A mixture consisting of about 172 gm. (2.0 mols) of 2-methyl butene 1-ol 3 and about 144 gm. (2.0 mols) of isobutyraldehyde was charged to a suitable apparatus and about 450 cc. of an aqueous 12% $H_2SO_4$ solution were added thereto. The mixture was refluxed under atmospheric pressure for about 1.5 hours. At the end of this time the mixture was cooled and allowed to stratify. The two layers were separated.

The upper layer was dried and fractionated. The following products were obtained:

Acetals of isoamylene glycols
 with isobutyraldehyde_____ 158 gm. (1.0 mol.)
Mixture of methyl isopropyl
 ketone and methyl ethyl
 acetaldehyde_____ 17 gm. (0.2 mol.)
Unchanged 2-methyl butene
 1-ol 3_____ 60 gm. (0.7 mol.)
Unchanged isobutyraldehyde_ 72 gm. (1.0 mol.)

The acetals of the isoamylene glycols with isobutyraldehyde boiled at a temperature of about 154° C. under atmospheric pressure.

The lower or aqueous layer of the stratified reaction mixture was neutralized and fractionated. After all the water had been removed, the residue contained about 10 gm. (0.10 mol.) of a mixture of trimethyl ethylene glycol and methyl ethyl ethylene glycol.

Example X

About 172 gm. (2.0 mols) of 2-methyl butene 1-ol 3 were added to about 400 cc. of an equeous 12% $H_2SO_4$ solution and the mixture refluxed for about 2 hours. At the end of this time the reaction mixture was cooled and allowed to stratify. The upper layer was separated, dried and fractionated. The fractionation yielded the following products:

Methyl isopropyl ketone_____ 34 gm. (0.4 mol.)
Acetals of isoamylene glycols
 with methyl ethyl acetaldehyde _____ 86 gm. (0.5 mol.)
Unreacted 2-methyl butene 1-ol
 3_____ 34 gm. (0.4 mol.)

After neutralization and distillation of the lower layer of the stratified reaction mixture, the residue was found to contain about 10 gm. (0.1 mol.) of a mixture of trimethyl ethylene glycol and methyl ethyl ethylene glycol.

Example XI

About 172 gm. (2.0 mols) of tiglyl alcohol

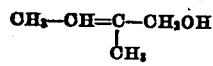

were refluxed with about 400 cc. of an aqueous 12% $H_2SO_4$ solution for about 1 hour. At the end of this time the mixture was cooled and allowed to stratify. The upper layer was separated, dried and fractionated. The fractionation yielded the following products:

A mixture of methyl isopropyl
 ketone and methyl ethyl
 acetaldehyde_____ 17 gm. (0.2 mol.)
Acetals of isoamylene glycols
 with methyl ethyl acetaldehyde _____ 103 gm. (0.6 mol.)
Unreacted tiglyl alcohol_____ 34 gm. (0.4 mol.)

The lower layer separated from the stratified reaction mixture was neutralized and the water removed by fractionation. The residue contained about 10 gm. of a mixture of α-methyl α-ethyl ethylene glycol and trimethyl ethylene glycol.

Example XII

About 144 gm. (2.0 mols) of isobutenol were charged to a reaction vessel equipped with a reflux condenser, means for stirring its contents and heating and cooling means. The isobutenol was cooled to a temperature of about 0° C. While the cooled isobutenol was stirred, about 2 cc. of concentrated $H_2SO_4$ were added to it slowly. The mixture was then warmed slowly to its boiling point. The raising of the temperature must be done slowly and with great care or the reaction may become uncontrollable due to the heat evolved. The mixture was refluxed for about 5 minutes and then cooled, discharged from the reactor and poured on ice. The aqueous mixture was neutralized and allowed to stratify. The upper layer was separated, dried and fractionated.

The fractionation yielded about 24 gm. (0.34 mol.) of isobutyraldehyde, 56 gm. (0.4 mol.) of the acetal of isobutylene glycol with isobutyraldehyde and about 48 gm. of a high-boiling polymer.

The cyclic acetals prepared by our process are useful in the manufacture of varnishes, coating compositions, dopes, plastic masses, molding powders and the like. The cyclic acetals severally or in mixtures, may be used for a wide variety of solvent and extraction purposes and as softening agents or plasticizers for cellulose ethers and esters. In addition, they are valuable intermediates in the preparation of polyhydric alcohols, ethers, esters, acids, aldehydes and resinous polymerization and condensation products.

The cyclic acetals of polyhydric alcohols, which contain more than four carbon atoms to the molecule and a tertiary carbinol group, with aldehydes are novel compounds characterized by the possession of a heterocyclic ring which embraces a tertiary carbon atom linked to an oxygen atom of said ring. Further, the cyclic acetals of isobutylene glycol with aldehydes, which aldehydes contain more than four carbon atoms to the molecule, are also novel and valuable cyclic acetals.

The novel cyclic acetals prepared in accordance with our invention may be represented by the general formula Y—X, wherein Y contains at least five carbon atoms and represents the radical

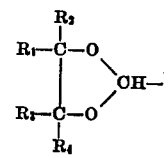

in which $R_1$ and $R_2$ may be the same or different and represent hydrocarbon radicals, $R_3$ and $R_4$ being the same or different and representing hydrogen atoms or hydrocarbon radicals, and wherein X represents a hydrogen atom or an organic radical with a free carbon linkage, X containing at least four carbon atoms when Y contains only five carbon atoms.

The novel cyclic acetals of isobutylene glycol may be represented by the formula—

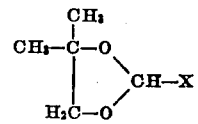

wherein X represents an organic radical with a free carbon linkage and containing at least four carbon atoms.

The polyhydric alcohols prepared in accordance with this invention are valuable agents for a wide variety of solvent and extraction purposes. They are useful as components of anti-freeze solutions, preservative solutions, etc. In addition, they are valuable intermediates in the preparation of valuable organic compounds as esters, ethers, acetals, carboxylic acids, saturated and unsaturated aldehydes and ketones and the like.

While we have in the foregoing described in some detail the preferred embodiments of our invention and some variants thereof, it will be understood that this is only for the purpose of making the invention more clear and that the same is not to be regarded as limited to the details of operation described nor is it dependent on the soundness or accuracy of the theories advanced as to the advantageous results attained. On the other hand, the invention is to be regarded as limited only by the terms of the appended claims in which it is our intention to claim all novelty inherent therein as broadly as possible in view of the prior art.

We claim as our invention:

1. The step of converting an unsaturated alcohol to a cyclic acetal which comprises treating an unsaturated alcohol possessing an olefinic linkage between two aliphatic carbon atoms with a mineral acid-acting compound at a temperature favorable to cyclic acetal formation.

2. The step of converting an unsaturated alcohol to a cyclic acetal which comprises reacting an unsaturated alcohol possessing an olefinic linkage between two aliphatic carbon atoms with an aldehyde in the presence of a mineral acid-acting compound at a temperature favorable to cyclic acetal formation.

3. The step of converting an unsaturated alcohol to a cyclic acetal which comprises reacting an unsaturated alcohol possessing an olefinic linkage between two aliphatic carbon atoms at least one of which is tertiary and not more than once removed from a carbinol group with an aldehyde in the presence of water and a mineral acid-acting compound at a temperature favorable to cyclic acetal formation.

4. The step of preparing the cyclic acetal of the formula—

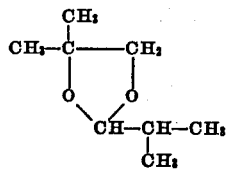

which comprises reacting isobutenol with isobutyraldehyde in the presence of a mineral acid at a temperature favorable to cyclic acetal formation.

5. The cyclic acetal of the general formula Y—X, wherein Y represents the radical—

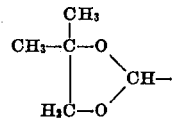

and X represents an organic radical with a free carbon linkage and containing at least four carbon atoms.

6. The cyclic acetal of the general formula X—Y, wherein Y represents the radical—

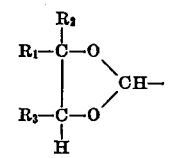

in which $R_1$ and $R_2$ represent hydrocarbon radicals and $R_3$ represents a hydrocarbon radical or a hydrogen atom, and wherein X represents a hydrogen atom or a hydrocarbon radical, X containing at least four carbon atoms when $R_3$ is a hydrogen atom.

7. The cyclic acetal of the general formula X—Y, wherein Y represents the radical—

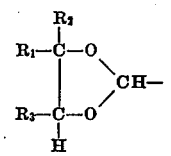

in which $R_1$, $R_2$ and $R_3$ are the same or different hydrocarbon radicals, and wherein X represents a hydrogen atom or a hydrocarbon radical.

8. The cyclic acetal of the general formula X—Y, wherein Y represents the radical—

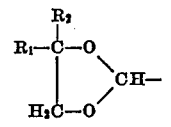

in which $R_1$ and $R_2$ represent hydrocarbon radicals, and wherein X represents a hydrocarbon radical containing more than three carbon atoms.

HERBERT P. A. GROLL.
GEORGE HEARNE.